Sept. 4, 1951  J. W. McDEVITT  2,566,577
LIFTER FOR LIFTING ROAST FOWL, MEAT, ETC
Filed Jan. 28, 1949

INVENTOR.
John W. McDevitt,
BY
Bush & Bush,
His Attorneys.

Patented Sept. 4, 1951

2,566,577

UNITED STATES PATENT OFFICE 2,566,577

LIFTER FOR LIFTING ROAST FOWL, MEAT, ETC.

John W. McDevitt, Davenport, Iowa

Application January 28, 1949, Serial No. 73,263

4 Claims. (Cl. 294—106)

My invention relates to lifters for lifting roasted fowl, roasted meats and similar hot foods to transfer them from a cooking utensil to a platter.

The objects of my invention are to provide simple means for the purpose indicated, with prongs or grippers which will act automatically to seize the object to be lifted; to provide means for either spreading or retracting the grippers or prongs of the gripping elements which can be easily operated by a finger and thumb while holding the appliance by a handle; to provide prongs or gripping elements which can be folded up against the supporting body in a relatively small space.

I accomplish these objects by the means shown in the accompanying drawings, in which—

Similar numerals refer to similar parts throughout the several views.

Figure 1:
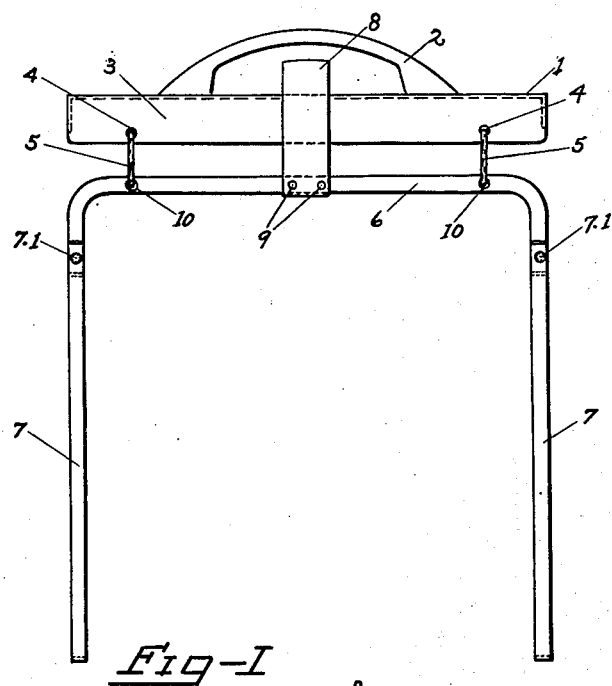
Figure 1 is a side elevation of my utensil.
Figure 2:
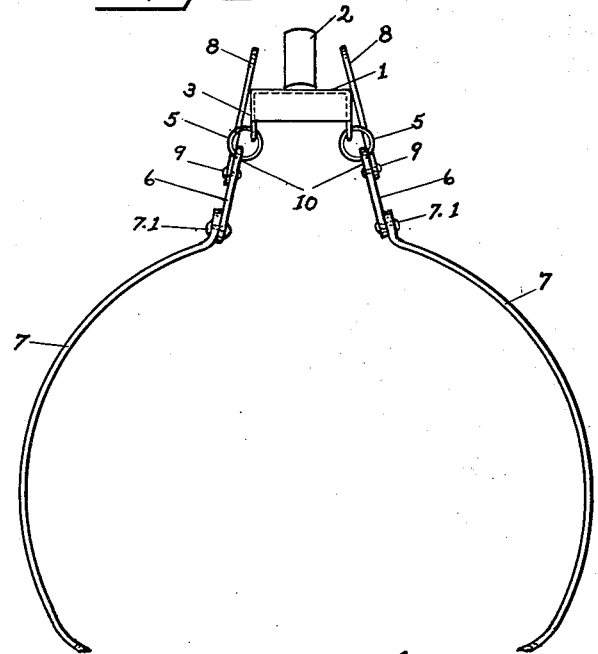
Figure 2 is an end elevation.

My device embodies a body 1, preferably composed of a plate of thin sheet metal, with flanges 3 extending downwardly from each side, and a handle 2 of any convenient form united to the top of the body.

Bores 4—4 are formed in the flanges near the ends thereof and supporting metal rings 5—5 are mounted in the bores and extend downwardly therefrom.

Crossbars 6—6 having bores 10—10 formed therein, are mounted upon the lower portion of the rings 5—5 with prongs or grippers 7—7 formed integral with the crossbars or pivotally united thereto by pivots 7.1—7.1.

The lower ends of the prongs 7 are preferably sharpened sufficiently to readily enter or envelop the meat or fowl to be lifted and secure a firm contact therewith.

Small plates 8—8 are united to the crossbars 6—6 by rivets 9—9 or other suitable means and extend upwardly on opposite sides of the body preferably near one end of the handle where they can readily be manipulated by the thumb and one finger of the operator while holding the handle with the remaining fingers of the same hand.

These plates 8—8 are so arranged that pressure outwardly upon the upper ends will force the prongs toward each other and that when the upper ends of the plates are retracted or drawn toward each other by a thumb and finger, they will cause the prongs to separate or spread apart.

It will be noted that the lower ends of the prongs 7—7 are sharpened and when the plates 8 are moved into vertical position by the thumb and finger of the operator as described, the sharpened points of the prongs 7 will rest under the central portion of the fowl or meat and will be inclined upwardly sufficiently to readily engage the meat or fowl and an upward pull upon the handle 2 will cause these prongs to enter the fowl or the meat when so positioned. By this means the prongs 7 will be attached to the under side of the meat or fowl sufficiently to lift it and prevent dropping thereof. In order to insure firm attachment of the prongs to the meat, the prongs or legs 7 are curved outwardly so as to surround the fowl or piece of meat to be secured thereby and the lower ends of the prongs may extend inwardly to a point approximately at or close to a vertical longitudinal plane through the middle of the fowl or meat.

In the operation of my utensil, the prongs are extended downwardly from the body and spread apart by retracting or drawing toward each other the upper ends of the plates 8—8 which will act as a lever fulcrumed upon either the lower edges of the flanges or upon the upper corners of the body and will separate or spread the prongs apart.

The points of the prongs can then be placed in juxtaposition with the bottom of the meat or fowl to be lifted and the prongs drawn toward each other either by spreading apart the upper ends of the plates 8—8 or by the action of gravity.

The handle may then be raised and the natural action of gravity and the pull upon the crossbars will cause the prongs to engage and remain engaged with the meat or fowl to be lifted.

After being removed to a platter, the meat or fowl can be released by retracting or drawing together the upper ends of the plates 8—8, thereby spreading the prongs apart and releasing their load.

When ready to lay the device away, the prongs 7—7 may be swung upon the pivots 7.1—7.1 into position parallel with the body and thus occupy a much smaller space than if open.

Various changes may be made in the materials used and the proportion of the parts without departing from the spirit of my invention and I do not limit my claims to the precise forms shown in the drawings.

I claim:

1. A lifter for roasted fowl and meats, comprising an elongated body of sheet metal or other suitable material, with downwardly extending flanges united to the sides thereof, a pair of rings mounted in suitable bores formed in each of the flanges respectively at opposite ends thereof, longitudinal bars substantially parallel with the body mounted upon each pair of rings severally below their flanges, downwardly extending arms united to the bars respectively having inwardly turned prongs at their lower ends whereby they may engage and lift a fowl or piece of meat encompassed thereby, a handle united to the upper face of the body, and small manually operable plates united to the longitudinal bars extending upwardly adjacent the flanges on opposite sides of the body.

2. A lifter for roasted fowl and meats, comprising an elongated body of sheet metal or other suitable material, with downwardly extending flanges united to the sides thereof, a pair of rings mounted in suitable bores formed in each of the flanges respectively at opposite ends thereof, longitudinal bars substantially parallel with the body mounted upon each pair of rings severally below their flanges, downwardly extending arms united to the bars respectively having inwardly turned prongs at their lower end whereby they may engage and lift a fowl or piece of meat encompassed thereby, a handle united to the upper face of the body, and small manually operable plates united to the longitudinal bars extending upwardly adjacent the flanges on opposite sides of the body and arranged to bear against either the lower or upper edges of the flanges as a fulcrum whereby the prongs may be spread apart by the manually operable plates.

3. A lifter for roasted fowl and meats, comprising an elongated body of sheet metal or other suitable material, with downwardly extending flanges united to the sides thereof, a pair of rings mounted in suitable bores formed in each of the flanges respectively at opposite ends thereof, longitudinal bars substantially parallel with the body mounted upon each pair of rings severally below their flanges, downwardly extending arms united to the bars respectively having inwardly turned prongs at their lower ends whereby they may engage and lift a fowl or piece of meat encompassed thereby, a handle united to the upper face of the body, and small manually operable plates united to the longitudinal bars extending upwardly adjacent the flanges on opposite sides of the body and arranged to move the prongs toward each other when the upper ends of the plates are spread apart manually and the rings used as a fulcrum for the plates, longitudinal bars and prongs as units.

4. In a meat lifter, the combination with a longitudinal body, of downwardly extending flanges united to the sides thereof, a pair of rings mounted in suitable bores formed in each of the flanges respectively at opposite ends thereof, longitudinal bars substantially parallel with the body mounted upon each pair of rings severally below their flanges, downwardly extending prongs united to the bars arranged to engage and lift a fowl or portion of meat, a handle united to the upper face of the body, and small manually operable plates to the longitudinal bars extending upwardly adjacent the flanges on opposite sides of the body and arranged to bear against the lower or upper edges of the flanges as a fulcrum whereby the prongs may be spread apart by the manually operable plates.

JOHN W. McDEVITT.

REFERENCES CITED

The following references are of record in the file of this patent:

UNITED STATES PATENTS

| Number | Name | Date |
| --- | --- | --- |
| 361,863 | Coleman | Apr. 26, 1887 |
| 2,434,163 | Jobe | Jan. 6, 1948 |